United States Patent [19]

Bridges

[11] Patent Number: 4,547,054
[45] Date of Patent: Oct. 15, 1985

[54] FINGER OVER THE LENS DETECTING APPARATUS

[75] Inventor: Mark E. Bridges, Spencerport, N.Y.

[73] Assignee: Eastman Kodak Company, Rochester, N.Y.

[21] Appl. No.: 576,683

[22] Filed: Feb. 3, 1984

[51] Int. Cl.⁴ ............................................. G03B 17/38
[52] U.S. Cl. .................................. 354/268; 354/289.1
[58] Field of Search ............ 354/467, 484, 266, 267.1, 354/268, 289.1, 289.11, 289.12, 288, 354

[56] References Cited

U.S. PATENT DOCUMENTS

| | | | |
|---|---|---|---|
| 3,878,548 | 4/1975 | Ettischer | 354/268 |
| 4,130,358 | 12/1978 | Lang et al. | 354/289.12 |
| 4,324,472 | 4/1982 | Terada et al. | 354/354 |

*Primary Examiner*—Russell E. Adams
*Attorney, Agent, or Firm*—Roger A. Fields

[57] ABSTRACT

In a photographic camera, a finger pressure sensitive member extends substantially around the optical path of a taking lens. The pressure sensitive member is supported for movement to a plurality of positions in response to finger pressure at respective locations around the optical path. If a finger is inadvertently placed over the taking lens at any angle, it will move the pressure sensitive member to a corresponding one of the positions. A sensing device extends around the optical path in a manner similar to that of the pressure sensitive member for sensing movement of the member to each of its positions. An indicator connected to the sensing device alerts the camera user before the user takes a picture that a finger may be blocking the taking lens, whenever the sensing device senses movement of the pressure sensitive member to any one of its positions.

6 Claims, 3 Drawing Figures

FINGER OVER THE LENS DETECTING APPARATUS

BACKGROUND OF THE INVENTION

1. Field of the Invention

The invention relates to apparatus in a photographic camera for detecting that a camera user's finger (or other portion of the user's hand) may be in front of the taking lens.

2. Description of the Prior Art

As photographic cameras get smaller in size, it becomes more likely that a camera user may inadvertently locate a finger in front of the taking lens before the user depresses the shutter release to take a picture. Should the user take a picture with a finger over the lens, the picture will of course be ruined.

A solution to this problem, as shown in U.S. Pat. No. 3,878,548, granted Apr. 15, 1975, is a mechanism for alerting the camera user before the user takes a picture that the user's finger is located in front of the taking lens. In the patent, a lens cover is manually slidable along an elongate opening in the camera face between a closed position, covering a lens opening, and an opened position, behind the camera face. When the lens cover is in the opened position, the only portion of it that is accessible to the camera user is a push tab, which projects from the elongate opening at a location proximate the lens opening (and in an alternate embodiment, extends around the lens opening). If a camera user's finger is pressed against the push tab, with the lens cover in the opened position, the cover is shown to swing inwardly from behind the camera face about a secured end of the cover remote from the push tab. Such a change of positon of the lens cover causes it to move a warning flag into the viewfinder, which alerts the camera user before the user takes a picture that the user's finger is located in front of the taking lens.

While the mechanism disclosed in the '548 patent may perform satisfactorily, it appears to have certain limitations. For example, when a finger is inadvertently placed over the taking lens at different angles, the lens cover must always undergo substantially the same change of position to alert the camera user that the user's finger is blocking the lens. As disclosed, the lens cover is supported for pivotal movement only about one axis, and therefore is restricted to the same change of position for alerting the camera user, regardless of the angle of a finger over the taking lens. Restricting the lens cover, under these circumstances, to only one change of position limits its sensitivity as a finger over the lens sensor, hastens its wear, and may make it susceptible to jamming.

SUMMARY OF THE INVENTION

My invention represents an improvement over known finger over the lens detecting apparatus, such as the one disclosed in the '548 patent, by providing detecting apparatus, which comprises:

finger pressure sensitive means extending at least partially, though preferably substantially, around the optical path of the taking lens for undergoing various changes of position in response to finger pressure at respective locations around the optical path;

means extending around the optical path in a manner similar to that of the finger pressure sensitive means for sensing each of the changes of position of the pressure sensitive means; and means connected to the sensing means for alerting the camera user that a finger may be in the optical path, whenever the sensing means senses any one of the changes of position of the finger pressure sensitive means.

According to the invention, therefore, a finger inadvertently placed over the taking lens at different angles will move the pressure sensitive means to its respective positions, which are individually sensed to alert the camera user that the user's finger is blocking the lens.

In a preferred embodiment of the invention, a touch plate has a central opening for the optical path of the taking lens. The touch plate is supported within a larger opening in the camera face for pivotal movement about respective axes to undergo various changes of position, in response to finger pressure on the touch plate at any one of a number of locations around the optical path. A printed circuit has a pair of conductive lines disposed in spaced relation around the optical path for connection together to close the electrical circuit. A switch in the form of an annular conductive member concentrically disposed in a manner similar to that of each of the conductive lines is fixed to the touch plate for movement to connect the lines, to thereby close the circuit, whenever the touch plate is pivoted about any one of its axes to undergo a change of position. Indicator means, such as a lamp or a camera shutdown device, in the electrical circuit is then activated to alert the camera user before the user takes a picture that a finger may be located in front of the taking lens.

BRIEF DESCRIPTION OF THE DRAWINGS

The invention will be described with respect to the drawings, wherein.

DESCRIPTION OF THE PREFERRED EMBODIMENT

The invention is described as being embodied in a still picture camera. Because such cameras are well known, this description is directed in particular to camera elements forming part of or cooperating directly with the preferred embodiment. It is to be understood, however, that camera elements not specifically shown or described may take forms known to persons of ordinary skill in the camera art.

The term "optical path" as used in describing the invention refers to the ray path taken by the light rays, which are reflected from a subject being photographed, through the taking lens in the camera, and onto a section of the film.

Figure 1:
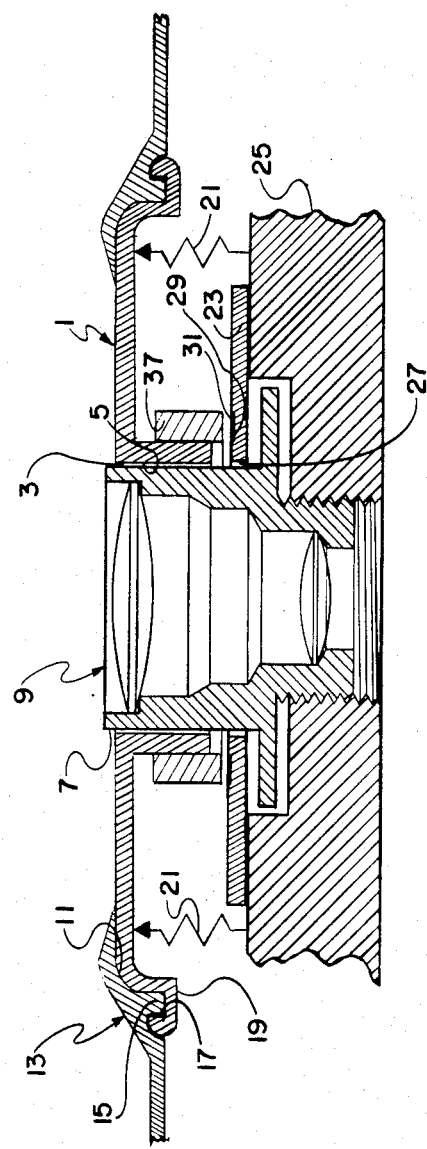
FIG. 1 is a sectional view of apparatus in a photographic camera for detecting that a camera user's finger may extend in front of the taking lens, in accordance with a preferred embodiment of the invention.
Figure 2:
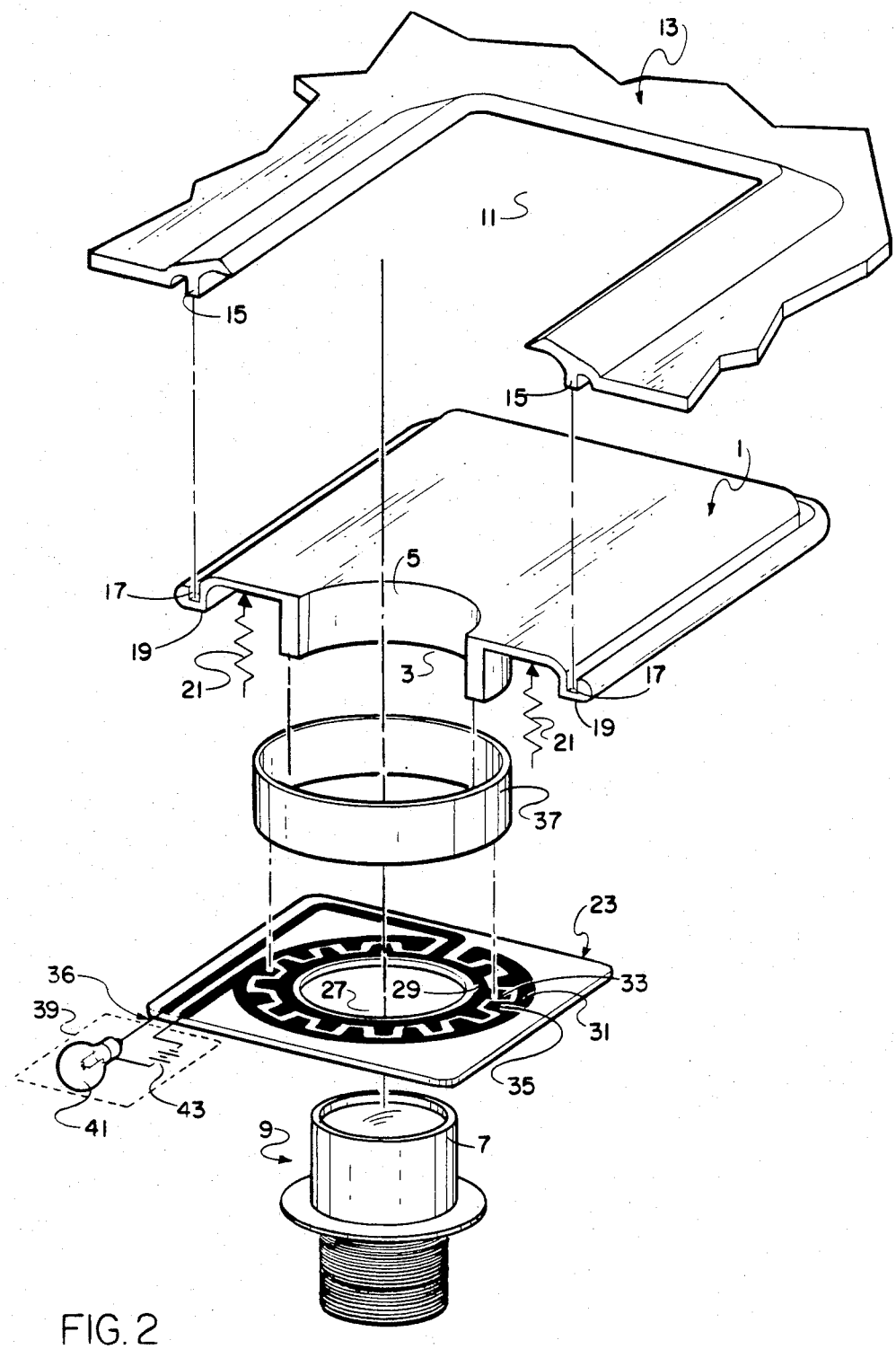
FIG. 2 is an exploded perspective view substantially of the apparatus in FIG. 1.
Figure 3:
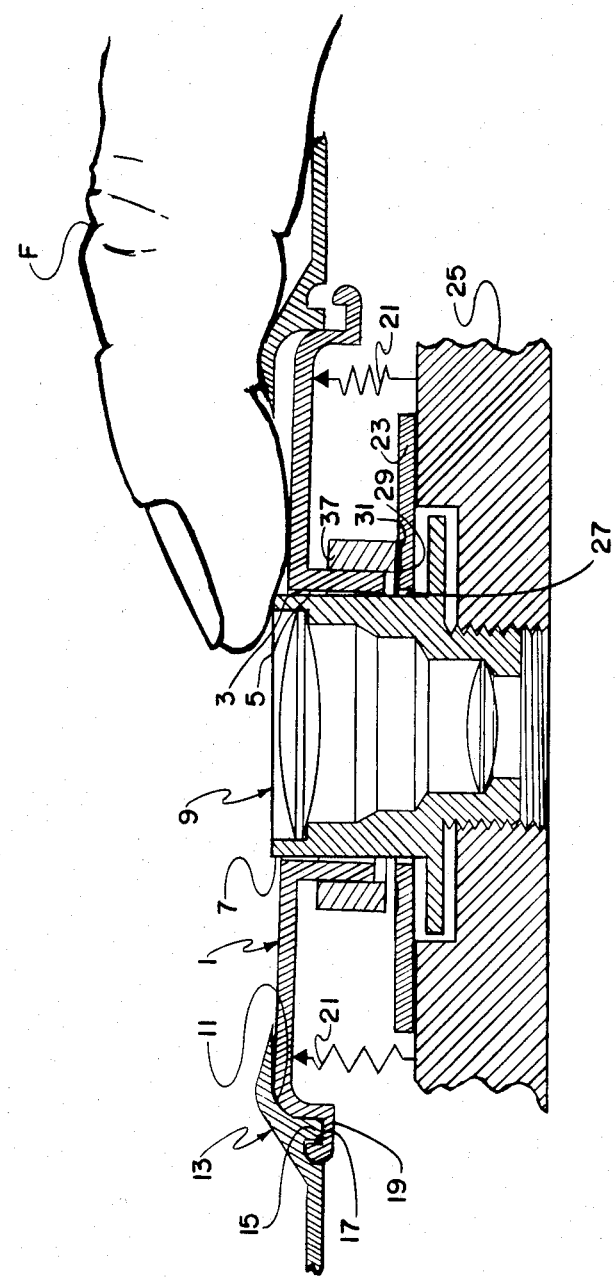
FIG. 3 is a sectional view similar to FIG. 1, showing operation of the apparatus when a finger blocks the taking lens.

Referring now to the drawings, FIGS. 1 and 2 show apparatus in a camera for detecting that a user's finger may be in front of the taking lens and for alerting the camera user before the user takes a picture. As depicted, a touch plate 1 has a central opening 3 provided with an annular rim 5, which is disposed in spaced relation concentrically about a barrel housing 7 of a conventional lens assembly 9. The touch plate 1, for the most part, is located within a similar shaped opening 11 in the camera face 13. A continuous rib 15 on the inside of the camera face 13, around the face opening 11, extends within a continuous groove 17 in a circumferential edge position 19 of the touch plate 1. A plurality of schematically shown springs 21 push against the plate edge portion 19 to urge the touch plate 1 toward the camera face 13, to thereby maintain the rib 15 within the groove 17. Such coupling of the rib 15 and the groove 17, maintained by the springs 21, operates to support the touch plate 1 for tilting movement about respective pivot axes to various positions, in response to finger pressure on the touch plate at corresponding locations around the lens assembly 9. If, therefore, a finger F is inadvertently placed in front of the lens assembly 9 at any angle, to thereby extend into the optical path of the lens assembly, the finger wll tilt the touch plate 1, as shown in FIG. 3, to a corresponding one of its positions.

A printed circuit board 23 is fixed to a support member 25 within the camera housing, not shown, and has a central opening 27 through which the barrel housing 7 of the lens assembly 9 extends. The circuit board 23, as shown in FIG. 2, includes a pair of multi-tooth contact traces 29 and 31, which are disposed in spaced relation concentrically about the board opening 27 for connection together at any two adjacent teeth (e.g., the teeth 33 and 35) of the respective traces to close an electrical circuit 36. A switching element in the form of a conductive ring 37 is fixed to the touch plate 1 about its central opening 3 for tilting movement to connect the two contact traces 29 and 31, by contacting any two adjacent teeth of the respective traces, to thereby close the electrical circuit 36, whenever the touch plate 1 is pivoted about one of its axes to undergo a change of position in response to finger pressure on the touch plate, as shown in FIG. 3. Indicator means 39, such as a visible lamp 41 energized by a battery 43, or a camera shutdown device, not shown, in the electrical circuit 36 is then energized to alert the camera user that the finger pivoting the touch plate 1 may extend into the optical path of the lens assembly 9.

According to the preferred embodiment, therefore, a finger inadvertently placed in front of the lens assembly 9 at different angles will move the pressure sensitive touch plate 1 to its respective positions, which are individually sensed to alert the camera user that the user's finger is blocking the lens assembly.

While the invention has been described with reference to a preferred embodiment, it will be understood that variations and modifications can be effected within the ordinary skill in the art without departing from the scope of the invention. For example, instead of using the touch plate 1 and the conductive ring 37 to close the electrical circuit 36, there may be used a resiliently flexible (i.e., elastic) touch plate which, itself, is conductive. Instead of using the pair of contact traces 29 and 31, which must be bridged by the conductive ring 37 to close the electrical circuit 36, a single contact trace may be used in combination with a conductive ring on the touch plate 1, which is connected by a flexible conductive lead to the indicator means 39. When the ring contacts the trace, due to tilting movement of the touch plate in response to finger pressure, the circuit is closed.

I claim:

1. Apparatus in a photographic camera for detecting that a camera user's finger may be in the optical path of a taking lens, said apparatus comprising:
   finger pressure sensitive means extending at least partially around the optical path of said lens for undergoing various changes of position in response to finger pressure at respective locations around the optical path;
   means for sensing each of the changes of position of said finger pressure sensitive means; and
   means connected to said sensing means for alerting the camera user that a finger may be in the optical path of said lens, whenever said sensing means senses any one of the changes of position of said finger pressure sensitive means.

2. Apparatus as recited in claim 1, wherein said finger pressure sensitive means includes touch means movable in respective directions to undergo the changes of position in response to finger pressure at the locations around the optical path.

3. Apparatus in a photographic camera for detecting that a camera user's finger may be in the optical path of a taking lens, said apparatus comprising:
   finger pressure sensitive means extending at least substantially around the optical path of said lens for undergoing various changes of position, with respect to the optical path, in response to finger pressure at separate locations around the optical path;
   means extending at least substantially around the optical path, proximate said finger pressure sensitive means, for sensing each of the changes of position of said sensitive means; and
   means connected to said sensing means for alerting the camera user that a finger may be in the optical path, whenever said sensing means senses any one of the changes of position of said finger pressure sensitive means.

4. Apparatus as recited in claim 3, wherein said finger pressure sensitive means includes a touch plate having a central opening for the optical path of said lens and means supporting said plate for pivotal movement about respective axes to undergo the changes of position.

5. Apparatus as recited in claim 4, wherein said sensing means includes electrical circuit means forming an open circuit extending at least substantially around the optical path of said lens and switching means extending in a manner similar to that of said open circuit for closing the open circuit in response to pivotal movement of said touch plate.

6. Apparatus as recited in claim 5, wherein said electrical circuit means includes a printed circuit having a pair of conductive lines concentrically disposed in spaced relation around the optical path of said lens for connection together to close said open circuit, and said switching means includes an annular conductive member concentrically disposed in a manner similar to that of said conductive lines and fixed to said touch plate for movement to connect said lines as said plate is pivoted.

* * * * *